United States Patent
Miyashita et al.

(10) Patent No.: US 8,537,254 B2
(45) Date of Patent: Sep. 17, 2013

(54) IMAGE SIGNAL PROCESSING DEVICE AND SOLID-STATE IMAGING DEVICE

(75) Inventors: Yuji Miyashita, Kanagawa (JP); Junichi Hosokawa, Kanagawa (JP); Masahiko Nozaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 13/232,219

(22) Filed: Sep. 14, 2011

(65) Prior Publication Data
US 2012/0147210 A1    Jun. 14, 2012

(30) Foreign Application Priority Data

Dec. 9, 2010   (JP) .................................. 2010-274773

(51) Int. Cl.
*H04N 5/20* (2006.01)
(52) U.S. Cl.
USPC ...................... 348/255; 348/223.1; 348/222.1
(58) Field of Classification Search
USPC ................. 348/243, 244, 245, 308, 294, 255, 348/223.1, 222.1
See application file for complete search history.

(56) References Cited

U.S. PATENT DOCUMENTS

| 6,700,609 | B1 * | 3/2004 | Abe ............................... 348/243 |
| 7,750,955 | B2 * | 7/2010 | Shirai et al. .................... 348/243 |
| 2002/0176009 | A1 * | 11/2002 | Johnson et al. ............... 348/229 |
| 2009/0040328 | A1 * | 2/2009 | Suzuki ......................... 348/222.1 |
| 2011/0074986 | A1 * | 3/2011 | Ogata ........................... 348/243 |

FOREIGN PATENT DOCUMENTS

| JP | 3-293863 | 12/1991 |
| JP | 2006-135726 | 5/2006 |
| JP | 2007-282204 | 10/2007 |

\* cited by examiner

*Primary Examiner* — Tuan Ho
*Assistant Examiner* — Zhenzhen Wu
(74) *Attorney, Agent, or Firm* — Oblon, Spivak, McClelland, Maier & Neustadt, L.L.P.

(57) ABSTRACT

According to the embodiment, a feedback clamp circuit is included, which increases or decreases a clamp parameter so that a black level approaches a target value while controlling a change amount of the clamp parameter, which sets the black level, based on the black level read out from OB pixels.

19 Claims, 4 Drawing Sheets

IMAGE SIGNAL PROCESSING DEVICE AND SOLID-STATE IMAGING DEVICE

CROSS-REFERENCE TO RELATED APPLICATIONS

This application is based upon and claims the benefit of priority from the prior Japanese Patent Application No. 2010-274773, filed on Dec. 9, 2010; the entire contents of which are incorporated herein by reference.

FIELD

Embodiments described herein relate generally to an image signal processing device and a solid-state imaging device.

BACKGROUND

In some solid-state imaging devices, OB (Optical Black) pixels are provided for setting a black level reference at the time of imaging. In this OB pixel, a dark voltage varies depending on use conditions such as a high temperature and a high sensitivity, so that a black level read out from the OB pixels deviates, which sometimes results in a phenomenon that an image becomes too white.

DETAILED DESCRIPTION

In general, according to a solid-state imaging device of an embodiment, a feedback clamp circuit is included. The feedback clamp circuit increases or decreases a clamp parameter so that a black level approaches a target value while controlling a change amount of the clamp parameter, which sets the black level, based on the black level read out from OB pixels.

A solid-state imaging device according to the embodiment will be explained below with reference to the drawings. The present invention is not limited to the embodiment.

Figure 1:
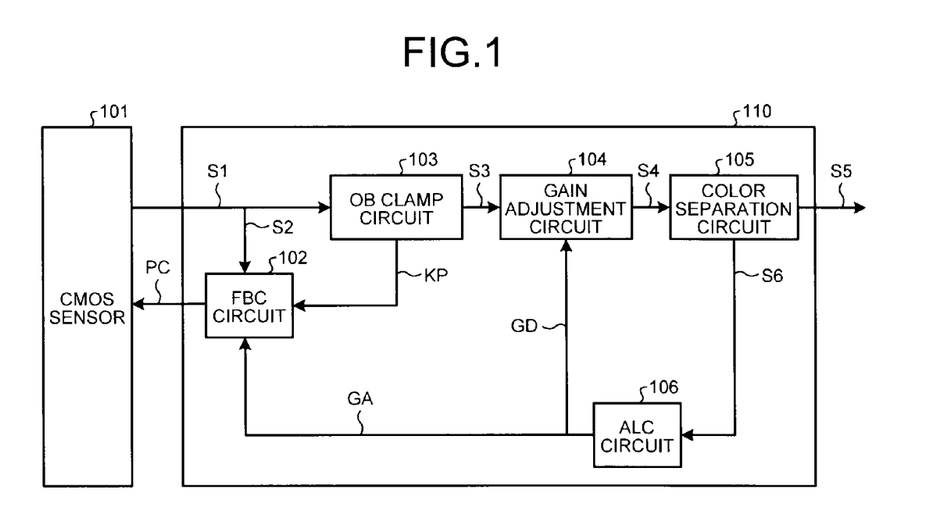
FIG. 1 is a block diagram illustrating a schematic configuration of a solid-state imaging device according to an embodiment.

FIG. 1 is a block diagram illustrating a schematic configuration of a solid-state imaging device according to an embodiment.

In FIG. 1, this solid-state imaging device includes a CMOS sensor 101 that outputs an image signal S1 and an image signal processing unit 110 that processes the image signal S1 read out from the CMOS sensor 101. For example, a Bayer array can be used as a filter array of the CMOS sensor 101 and the image signal S1 can include a RAW image signal.

The image signal processing unit 110 includes a feedback clamp circuit 102, an OB clamp circuit 103, a gain adjustment circuit 104, a color separation circuit 105, and an automatic level control circuit (ALC) 106.

The feedback clamp circuit 102 can increase or decrease a clamp parameter PC so that the black level read out from the OB pixels of the CMOS sensor 101 approaches a target value. The clamp parameter PC can adjust the black level read out from the OB pixels. The feedback clamp circuit 102 can control the change amount of the clamp parameter PC based on the black level read out from the OB pixels of the CMOS sensor 101. Moreover, the feedback clamp circuit 102 can make the black level read out from the OB pixels of the CMOS sensor 101 to converge to the target value before the image signal S1 is read out from an effective pixel unit of the CMOS sensor 101.

The OB clamp circuit 103 can clamp an image signal read out from the effective pixels based on the black level read out from the OB pixels of the CMOS sensor 101. Moreover, the OB clamp circuit 103 can calculate a clamp parameter correction coefficient KP based on the black level read out from the OB pixels of the CMOS sensor 101. The clamp parameter correction coefficient KP can control the change amount of the clamp parameter PC.

Moreover, the OB clamp circuit 103 can calculate the clamp parameter correction coefficient KP in units of row based on the integrated value of the black level read out from a plurality of OB pixels at the head of each horizontal line before the effective pixel unit of the CMOS sensor 101.

The gain adjustment circuit 104 can adjust the white balance and the gain of an image signal S3 output from the OB clamp circuit 103. As a parameter that adjusts the white balance or the gain, a command setting value or a digital gain GD can be used.

The color separation circuit 105 can convert an image signal S4 output from the gain adjustment circuit 104 into a color separation signal S5. As the color separation signal S5, for example, an RGB signal or a YUV signal can be used. At this time, the color separation circuit 105 can extract a luminance signal S6 from the image signal S4.

The automatic level control circuit 106 can perform luminance adjustment of a screen. At this time, the automatic level control circuit 106 can determine the brightness of a screen based on the luminance signal S6 and can adjust the digital gain GD and the analog gain GA.

In the CMOS sensor 101, incident light from an object is photoelectrically converted. Then, the image signal S1 generated in the CMOS sensor 101 is output to the OB clamp circuit 103. Moreover, OB signals S2 read out from the OB pixels of the CMOS sensor 101 are output to the feedback clamp circuit 102.

Then, in the OB clamp circuit 103, the image signal S3 is generated by clamping the image signal S1 based on the black level read out from the OB pixels and is output to the gain adjustment circuit 104. Moreover, in the OB clamp circuit 103, the clamp parameter correction coefficient KP is calculated based on the black level read out from the OB pixels of the CMOS sensor 101 and is output to the feedback clamp circuit 102.

Then, in the gain adjustment circuit 104, the gain of the image signal S3 is adjusted based on the digital gain GD output from the automatic level control circuit 106, so that the image signal S4 is generated, which is output to the color separation circuit 105.

Then, in the color separation circuit 105, the image signal S4 is converted into the color separation signal S5 to be output to the outside and the luminance signal S6 is extracted from the image signal S4 to be output to the automatic level control circuit 106.

Then, in the automatic level control circuit 106, the digital gain GD and the analog gain GA are adjusted based on the luminance signal S6, and the digital gain GD is output to the gain adjustment circuit 104 and the analog gain GA is output to the feedback clamp circuit 102.

Then, in the feedback clamp circuit 102, the change amount of the clamp parameter PC is set based on the analog gain GA and the clamp parameter correction coefficient KP. Then, the clamp parameter PC is increased or decreased according to the change amount of the clamp parameter correction coefficient KP so that the black level read out from the OB pixels of the CMOS sensor 101 approaches the target value, and the clamp parameter PC is output to the CMOS sensor 101.

Consequently, the change amount of the clamp parameter PC can be controlled based on the black level read out from the OB pixels of the CMOS sensor 101, so that the clamp parameter PC can be changed at high speed according to the variation of the black level read out from the OB pixels of the CMOS sensor 101. Therefore, in high-temperature and high-sensitivity use conditions, even when the black level read out from the OB pixels of the CMOS sensor 101 rises largely, a rise of the black level can be cancelled before the phenomenon that an image becomes too white occurs. Consequently, when the black level read out from the OB pixels of the CMOS sensor 101 rises largely, it is possible to prevent excessive control by the automatic level control circuit 106 that reduces the luminance level to solve the phenomenon that an image becomes too white, so that hunting can be prevented.

Figure 2:
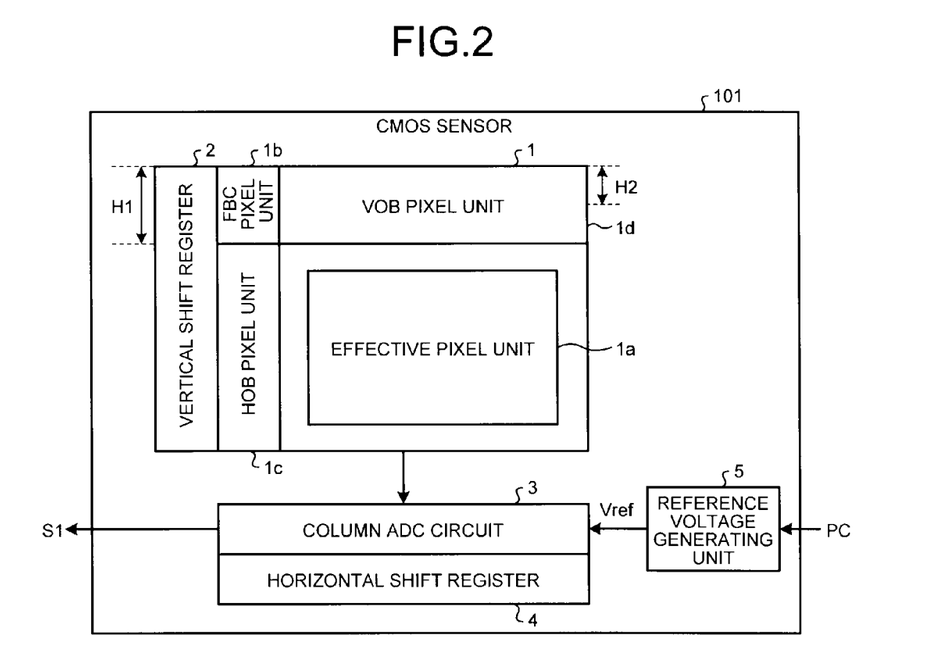
FIG. 2 is a block diagram illustrating a schematic configuration of a CMOS sensor in FIG. 1.

FIG. 2 is a block diagram illustrating a schematic configuration of the CMOS sensor in FIG. 1.

In FIG. 2, the CMOS sensor 101 includes a pixel array unit 1 in which pixels are arranged in a matrix manner in the row direction and the column direction. In the pixel array unit 1, an effective pixel unit 1a, in which pixels are arranged in a matrix manner in the row direction and the column direction, is provided, and an FBC pixel unit 1b, an HOB pixel unit 1c, and a VOB pixel unit 1d are provided around the effective pixel unit 1a.

In the FBC pixel unit 1b, the HOB pixel unit 1c, and the VOB pixel unit 1d, OB pixels can be provided. The FBC pixel unit 1b and the HOB pixel unit 1c can include a plurality of OB pixels in each horizontal line, and, for example, 128 pixels may be provided in each horizontal line. The OB pixels provided in the FBC pixel unit 1b can generate the black level used for calculating the clamp parameter correction coefficient KP. The OB pixels provided in the HOB pixel unit 1c can generate the black level used for clamping the image signal S1.

Moreover, the FBC pixel unit 1b can be provided in the head portion of the horizontal line before the effective pixel unit 1a. The HOB pixel unit 1c can be provided in the head portion of the same horizontal line as the effective pixel unit 1a. The VOB pixel unit 1d can be arranged continuously with the FBC pixel unit 1b in the horizontal line before the effective pixel unit 1a.

Moreover, the CMOS sensor 101 includes a vertical shift register 2 that scans the pixel array unit 1 in the vertical direction, a column ADC circuit 3 that digitalizes a signal component read out from the pixel array unit 1 in a CDS based on a comparison result with a reference voltage Vref, a horizontal shift register 4 that scans the pixel array unit 1 in the horizontal direction, and a reference voltage generating unit 5 that generates the reference voltage Vref based on the clamp parameter PC. The clamp parameter PC can set a clamp level of the reference voltage Vref. A ramp wave can be used as the reference voltage Vref.

The pixels in the pixel array unit 1 are scanned in the vertical direction by the vertical shift register 2, so that signals are read out from the pixels in the pixel array unit 1 and are sent to the column ADC circuit 3. Then, in the column ADC circuit 3, the signal components read out from the pixel array unit 1 are A/D converted in the CDS to be scanned in the horizontal direction by the horizontal shift register 4, whereby the image signal S1 is output.

At this time, in the feedback clamp circuit 102, the clamp parameter PC can be set so that a dark voltage of the OB pixels is compensated at the clamp level of the reference voltage Vref at the time of A/D conversion by the column ADC circuit 3.

Figure 3:
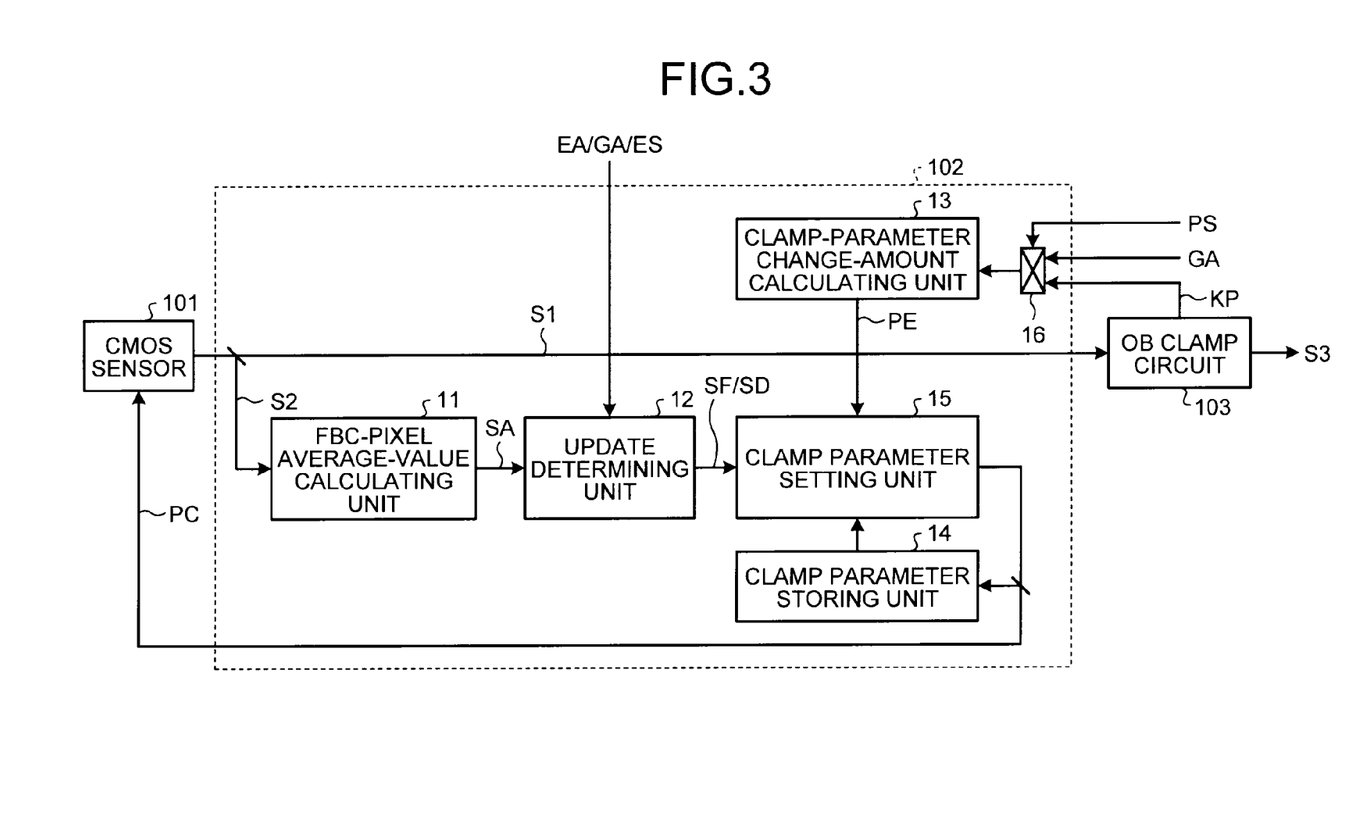
FIG. 3 is a block diagram illustrating a schematic configuration of a feedback clamp (FBC) circuit in FIG. 1.

FIG. 3 is a block diagram illustrating a schematic configuration of the feedback clamp circuit in FIG. 1.

In FIG. 3, the feedback clamp circuit 102 includes an FBC-pixel average-value calculating unit 11, an update determining unit 12, a clamp-parameter change-amount calculating unit 13, a clamp parameter storing unit 14, a clamp parameter setting unit 15, and a selector 16.

The OB signals S2 are read out from the FBC pixel unit 1b of the CMOS sensor 101 and are input to the FBC-pixel average-value calculating unit 11. Then, in the FBC-pixel average-value calculating unit 11, the black level read out from a plurality of OB pixels is averaged for each row to calculate an FBC pixel average value SA, which is output to the update determining unit 12. In the update determining unit 12, a target value EA to be a reference of the black level read out from the OB pixels, the analog gain GA, and an electronic shutter time ES are input.

Then, in the update determining unit 12, it is determined whether to update the clamp parameter PC based on the FBC pixel average value SA, the target value EA, the analog gain GA, and the electronic shutter time ES. When updating the clamp parameter PC, an update flag SF and an increase/decrease direction signal SD are output to the clamp parameter setting unit 15.

In the clamp parameter storing unit 14, the clamp parameter PC before update is stored. Then, the clamp parameter PC before update is output from the clamp parameter storing unit 14 to the clamp parameter setting unit 15.

In the selector 16, an FBC period pulse PS, the analog gain GA, and the clamp parameter correction coefficient KP are input. The FBC period pulse PS can be input to the selector 16 in an FBC pulse assertion period H2 in FIG. 2. The FBC pulse assertion period H2 can be set to the horizontal period for a first few lines in an FBC period H1. The FBC period H1 can be set to the period before the image signal S1 is read out from the effective pixel unit 1a in the pixel array unit 1.

Then, in the selector 16, when the FBC period pulse PS is input, the clamp parameter correction coefficient KP is selected and is output to the clamp-parameter change-amount calculating unit 13. When the FBC period pulse PS is not input, the analog gain GA is selected and is output to the clamp-parameter change-amount calculating unit 13.

Then, in the clamp-parameter change-amount calculating unit 13, a clamp parameter change amount PE is calculated based on the analog gain GA or the clamp parameter correction coefficient KP and is output to the clamp parameter setting unit 15.

Then, in the clamp parameter setting unit 15, when the update flag SF is output from the update determining unit 12, the clamp parameter PC is increased or decreased for each horizontal line by the amount specified by the clamp parameter change amount PE in the increase/decrease direction specified by the increase/decrease direction signal SD to be output to the CMOS sensor 101.

Figure 4:
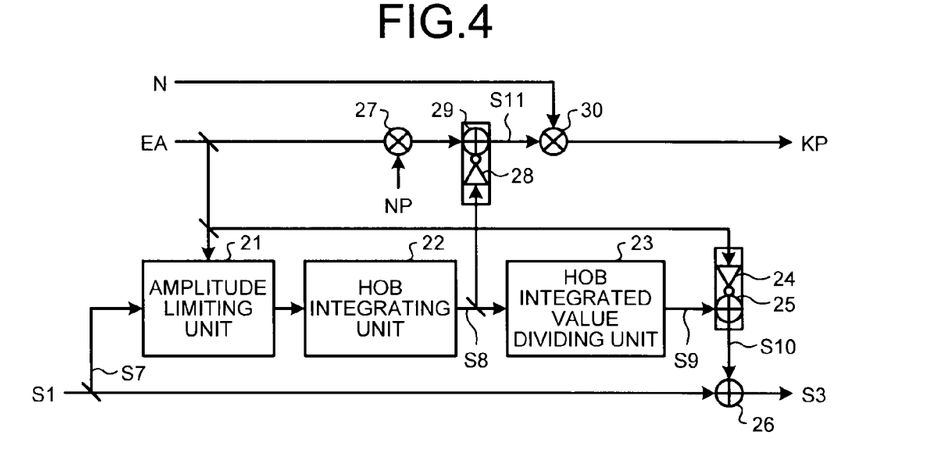
FIG. 4 is a block diagram illustrating a schematic configuration of an OB clamp circuit in FIG. 1.

FIG. 4 is a block diagram illustrating a schematic configuration of the OB clamp circuit in FIG. 1.

In FIG. 4, the OB clamp circuit 103 includes an amplitude limiting unit 21, an HOB integrating unit 22, an HOB integrated value dividing unit 23, inverters 24 and 28, adders 25, 26, and 29, and multipliers 27 and 30.

The image signal S1 read out from the CMOS sensor 101 is output to the adder 26 and OB signals S7 read out from the FBC pixel unit 1b and the HOB pixel unit 1c of the CMOS sensor 101 are output to the amplitude limiting unit 21.

Then, in the amplitude limiting unit 21, the amplitude of the OB signals S7 is limited based on the target value EA, which is preset by a command, to be output to the HOB integrating unit 22. For example, when the target value EA is set to 48 dB, the amplitude of the OB signals S7 can be limited in a range of 24 dB to 72 dB.

Then, in the HOB integrating unit 22, the OB signals S7 whose amplitude is limited are integrated for each horizontal period to generate an HOB integrated value S8, and the HOB integrated value S8 generated from the FBC pixel unit 1b is output to the adder 29 via the inverter 28 and the HOB integrated value S8 generated from the HOB pixel unit 1c is output to the HOB integrated value dividing unit 23.

Then, in the HOB integrated value dividing unit 23, the HOB integrated value S8 generated from the HOB pixel unit 1c is divided by the number of integrations NP to generate an HOB average value S9, which is output to the adder 25. The number of integrations NP can be set to the number of pixels for one horizontal line of the HOB pixel unit 1c, and is, for example, set to 128. The target value EA is input to the adder 25 via the inverter 28.

Then, in the adder 25, the target value EA is subtracted from the HOB average value S9 to generate an HOB difference value S10, which is output to the adder 26. Then, in the adder 26, the image signal S1 is clamped by adding the HOB difference value S10 to the image signal S1, whereby the image signal S3 is generated.

Moreover, in the multiplier 27, after the target value EA is multiplied by the number of integrations NP, in the adder 29, the output of the multiplier 27 and the output of the inverter 28 are summed to generate an HOB integrated difference value S11, which is output to the multiplier 30.

Then, in the multiplier 30, the HOB integrated difference value S11 is multiplied by an adjustment value N, so that the clamp parameter correction coefficient KP is calculated for each horizontal line and is output to the selector 16 in FIG. 3. The adjustment value N is a coefficient for adjusting the clamp parameter correction coefficient KP to an optimal clamp parameter change amount PE and can be set by a command. Moreover, the adjustment value N can be set to a value in a range of zero to one. This adjustment value N can be determined based on the RTL simulation, verification using an actual device, or the like. Moreover, the characteristics may be optimized by varying the adjustment value N in conjunction with the analog gain GA.

At this time, the clamp parameter correction coefficient KP can be given, for example, by the following equation.

$$KP = (EA \times NP - S8) \times N$$

Every time the clamp parameter correction coefficient KP is updated for each horizontal line, the clamp parameter PC generated in the feedback clamp circuit 102 is updated. Moreover, the reference voltage Vref is adjusted in the reference voltage generating unit 5 of the CMOS sensor 101, so that the HOB signal of the FBC pixel unit 1b approaches the target value. Therefore, the HOB integrated value S8 approaches the result of multiplication of the target value EA and the number of integrations NP, so that the HOB integrated difference value S11 becomes small. Thus, the clamp parameter correction coefficient KP also becomes small, enabling to prevent the black level from being overcorrected.

Figure 5:
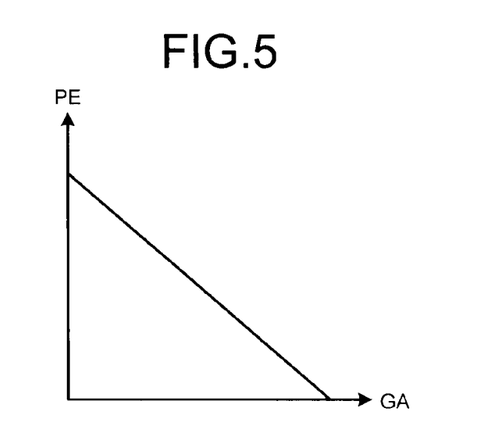
FIG. 5 is a diagram illustrating a relationship between an analog gain GA and a clamp parameter change amount PE of the solid-state imaging device in FIG. 1.

Moreover, in the FBC pulse assertion period H2, the clamp parameter correction coefficient KP is used for calculating the clamp parameter change amount PE, so that the clamp parameter change amount PE can be made large compared with the case of calculating the clamp parameter change amount PE from the relationship between the analog gain GA and the clamp parameter change amount PE as shown in FIG. 5 based on the analog gain GA, enabling to shorten the convergence time of the black level.

Furthermore, the FBC pixel unit 1b is provided in the head portion of the horizontal line before the effective pixel unit 1a, so that the black level read out from the HOB pixel unit 1c can be converged to the target value EA before the image signal S1 is read out from the effective pixel unit 1a in FIG. 2. Therefore, in the OB clamp circuit 103, when the image signal S1 is clamped based on the black level read out from the HOB pixel unit 1c, variation of the clamp level can be suppressed.

FIG. 5 is a diagram illustrating a relationship between the analog gain GA and the clamp parameter change amount PE of the solid-state imaging device in FIG. 1.

In FIG. 5, when the clamp parameter change amount PE is calculated based on the analog gain GA, the clamp parameter change amount PE becomes smaller as the analog gain GA becomes larger. Therefore, when the black level read out from the OB pixels of the CMOS sensor 101 rises largely, the convergence time of the black level becomes long as the analog gain GA becomes large.

Figure 6:
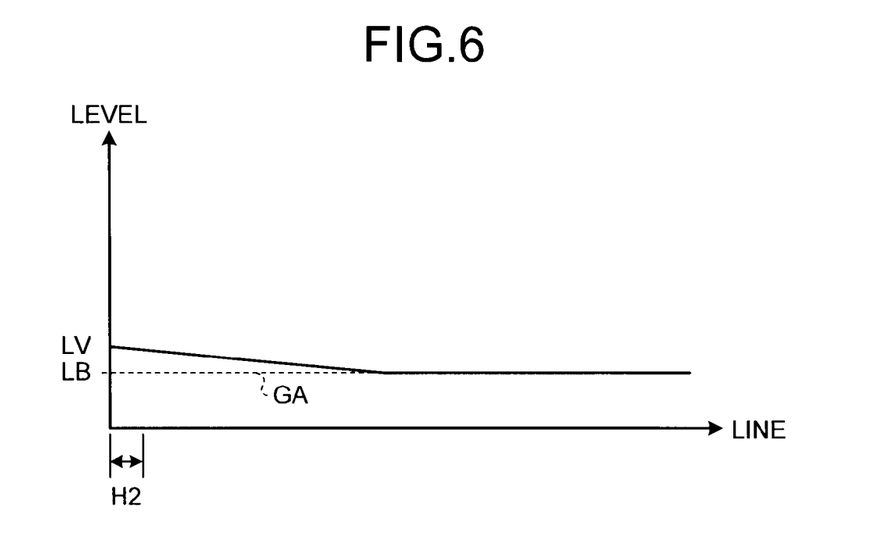
FIG. 6 is a diagram illustrating a convergence method of a black level LV at the time of a room-temperature and high-sensitivity operation of the solid-state imaging device in FIG. 1.

FIG. 6 is a diagram illustrating a convergence method of the black level LV at the time of a room-temperature and high-sensitivity operation of the solid-state imaging device in FIG. 1.

In FIG. 6, in the room-temperature and high-sensitivity operation, variation of the black level LV is small. Therefore, even when the clamp parameter change amount PE becomes small and the time until the black level LV converges to the reference level LB becomes long by calculating the clamp parameter change amount PE based on the analog gain GA, the phenomenon that an image becomes too white can be suppressed.

Figure 7:
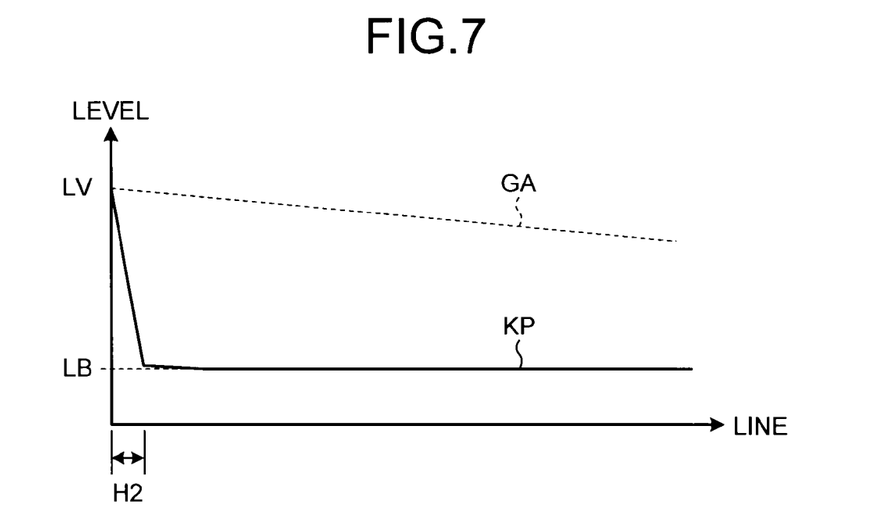
FIG. 7 is a diagram illustrating a convergence method of the black level LV at the time of a high-temperature and high-sensitivity operation of the solid-state imaging device in FIG. 1.

FIG. 7 is a diagram illustrating a convergence method of the black level LV at the time of a high-temperature and high-sensitivity operation of the solid-state imaging device in FIG. 1.

In FIG. 7, in the high-temperature and high-sensitivity operation, variation of the black level is large. Therefore, if the clamp parameter change amount PE is calculated based on the analog gain GA when the analog gain GA is large, the clamp parameter change amount PE becomes small because of the relationship between the analog gain GA and the clamp parameter change amount PE as shown in FIG. 5, so that time for a few frames is needed until the black level LV converges to the reference level LB. Consequently, the phenomenon that an image becomes too white occurs. If level control is performed by the automatic level control circuit 106 to solve this phenomenon, the luminance level is reduced and hunting occurs.

On the contrary, by using the clamp parameter correction coefficient KP for calculating the clamp parameter change amount PE in the FBC pulse assertion period H2 in the head portion of the FBC pixel unit 1b, even when the analog gain GA is large, the difference between the target value EA and the present black level can be directly reflected on the clamp parameter change amount, so that the clamp parameter change amount PE can be made large. Thus, time until the black level LV converges to the reference level LB can be shortened, so that even when level control is performed by the automatic level control circuit 106, hunting can be prevented from occurring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image signal processing device comprising:
   a feedback clamp circuit that increases or decreases a clamp parameter so that a black level approaches a target value while controlling a change amount of the clamp parameter, which sets the black level, based on the black level read out from OB pixels;
   an OB clamp circuit that clamps an image signal read out from effective pixels and calculates a clamp parameter correction coefficient that controls the change amount of the clamp parameter based on the black level read out from the OB pixels;
   a gain adjustment circuit that adjusts white balance and gain of an image signal output from the clamp circuit;
   a color separation circuit that converts an image signal output from the gain adjustment circuit into a color separation signal; and
   an automatic level control circuit that adjusts a digital gain and an analog gain based on a luminance signal extracted in the color separation circuit, and outputs the digital gain to the gain adjustment circuit and outputs the analog gain to the feedback clamp circuit.

2. The image signal processing device according to claim 1, wherein the OB clamp circuit calculates the clamp parameter correction coefficient in units of row based on an integrated value of a black level read out from a plurality of OB pixels at a head of each horizontal line before an effective pixel unit.

3. The image signal processing device according to claim 2, wherein the feedback clamp circuit makes the black level read out from the OB pixels to converge to the target value before an image signal is read out from the effective pixel unit.

4. The image signal processing device according to claim 1, wherein
   the feedback clamp circuit includes
      an FBC-pixel average-value calculating unit that averages the black level read out from the OB pixels,
      an update determining unit that determines whether to update the clamp parameter based on an average value calculated by the FBC-pixel average-value calculating unit, the target value to be a reference of the black level read out from the OB pixels, the analog gain, and an electronic shutter time,
      a clamp-parameter change-amount calculating unit that calculates the change amount of the clamp parameter based on the analog gain or the clamp parameter correction coefficient,
      a clamp parameter storing unit that stores a clamp parameter before update, and
      a clamp parameter setting unit that increases or decreases the clamp parameter by an amount specified by the change amount of the clamp parameter based on a determination result by the update determining unit.

5. The image signal processing device according to claim 4, wherein
   the update determining unit, when updating the clamp parameter, outputs an update flag and an increase/decrease direction signal to the clamp parameter setting unit, and
   the clamp parameter setting unit, when the update flag is output, increases or decreases the clamp parameter by an amount specified by the change amount of the clamp parameter in an increase/decrease direction specified by the increase/decrease direction signal for each horizontal line.

6. The s image signal processing device according to claim 4, further comprising a selector that switches between the analog gain and the clamp parameter correction coefficient to output to the clamp-parameter change-amount calculating unit.

7. The image signal processing device according to claim 4, wherein
   the OB clamp circuit includes
      an amplitude limiting unit that limits an amplitude of the black level read out from the OB pixels,
      an HOB integrating unit that integrates the black level, whose amplitude is limited, every horizontal period,
      an HOB integrated value dividing unit that calculates an HOB average value by dividing an HOB integrated value calculated in the HOB integrating unit by number of integrations,
      a first subtractor that calculates an HOB difference value by subtracting the target value from the HOB average value,
      a first adder that clamps the image signal read out from the effective pixels by adding the HOB difference value to the image signal,
      a first multiplier that multiplies the target value by the number of integrations,
      a second subtractor that calculates an HOB integrated difference value by subtracting the HOB integrated value from an output of the first multiplier, and
      a second multiplier that calculates the clamp parameter correction coefficient by multiplying the HOB integrated difference value by an adjustment value.

8. A solid-state imaging device comprising:
   a CMOS sensor that outputs an image signal; and
   an image signal processing unit that processes the image signal read out from the CMOS sensor, wherein
   the CMOS sensor includes
      an effective pixel unit in which effective pixels are arrayed,
      an OB pixel unit in which OB pixels are arrayed,
      a column ADC circuit that digitalizes a signal component read out from the effective pixels based on a comparison result with a reference voltage, and
      a reference voltage generating unit that generates the reference voltage, and the image signal processing unit includes a feedback clamp circuit that increases or decreases a clamp parameter that sets a black level so that the black level approaches a target value while controlling a change amount of the clamp parameter based on the black level read out from the OB pixels, and an OB clamp circuit that clamps an image signal read out from the effective pixels and calculates a clamp parameter correction coefficient that controls the change amount of the clamp parameter based on the black level read out from the OB pixels, wherein the OB pixel unit includes an FBC pixel unit in which OB pixels that generate a black level used for calculating the clamp parameter correction coefficient are provided, and an HOB pixel unit in which OB pixels that generate a black level used for clamping the image signal are provided.

9. The solid-state imaging device according to claim 8, wherein the reference voltage generating unit sets a level of the reference voltage based on the clamp parameter.

10. The solid-state imaging device according to claim 8, wherein the FBC pixel unit is provided in a head portion of a horizontal line before the effective pixel unit, and the HOB pixel unit is provided in a head portion of a same horizontal line as the effective pixel unit.

11. The solid-state imaging device according to claim 8, wherein the OB clamp circuit calculates the clamp parameter correction coefficient in units of row based on an integrated value of a black level read out from a plurality of OB pixels at a head of each horizontal line before the effective pixel unit.

12. The solid-state imaging device according to claim 11, wherein the feedback clamp circuit makes the black level read out from the OB pixels to converge to the target value before an image signal is read out from the effective pixel unit.

13. A solid-state imaging device comprising:

a CMOS sensor that outputs an image signal; and an image signal processing unit that processes the image signal read out from the CMOS sensor, wherein the CMOS sensor includes an effective pixel unit in which effective pixels are arrayed, an OB pixel unit in which OB pixels are arrayed, a column ADC circuit that digitalizes a signal component read out from the effective pixels based on a comparison result with a reference voltage, and a reference voltage generating unit that generates the reference voltage, and the image signal processing unit includes a feedback clamp circuit that increases or decreases a clamp parameter that sets a black level so that the black level approaches a target value while controlling a change amount of the clamp parameter based on the black level read out from the OB pixels, and an OB clamp circuit that clamps an image signal read out from the effective pixels and calculates a clamp parameter correction coefficient that controls the change amount of the clamp parameter based on the black level read out from the OB pixels, and the solid-state imaging device further comprising:

a gain adjustment circuit that adjusts white balance and gain of an image signal output from the OB clamp circuit;

a color separation circuit that converts an image signal output from the gain adjustment circuit into a color separation signal; and an automatic level control circuit that adjusts a digital gain and an analog gain based on a luminance signal extracted in the color separation circuit, and outputs the digital gain to the gain adjustment circuit and outputs the analog gain to the feedback clamp circuit.

14. The solid-state imaging device according to claim 13, wherein the feedback clamp circuit includes an FBC-pixel average-value calculating unit that averages the black level read out from the OB pixels, an update determining unit that determines whether to update the clamp parameter based on an average value calculated by the FBC-pixel average-value calculating unit, the target value to be a reference of the black level read out from the OB pixels, the analog gain, and an electronic shutter time, a clamp-parameter change-amount calculating unit that calculates the change amount of the clamp parameter based on the analog gain or the clamp parameter correction coefficient, a clamp parameter storing unit that stores a clamp parameter before update, and a clamp parameter setting unit that increases or decreases the clamp parameter by an amount specified by the change amount of the clamp parameter based on a determination result by the update determining unit.

15. The solid-state imaging device according to claim 14, wherein the update determining unit, when updating the clamp parameter, outputs an update flag and an increase/decrease direction signal to the clamp parameter setting unit, and the clamp parameter setting unit, when the update flag is output, increases or decreases the clamp parameter by an amount specified by the change amount of the clamp parameter in an increase/decrease direction specified by the increase/decrease direction signal for each horizontal line.

16. The solid-state imaging device according to claim 14, further comprising a selector that switches between the analog gain and the clamp parameter correction coefficient to output to the clamp-parameter change-amount calculating unit.

17. The solid-state imaging device according to claim 14, wherein the OB clamp circuit includes an amplitude limiting unit that limits an amplitude of the black level read out from the OB pixels, an HOB integrating unit that integrates the black level, whose amplitude is limited, every horizontal period, an HOB integrated value dividing unit that calculates an HOB average value by dividing an HOB integrated value calculated in the HOB integrating unit by number of integrations, a first subtractor that calculates an HOB difference value by subtracting the target value from the HOB average value, a first adder that clamps the image signal read out from the effective pixels by adding the HOB difference value to the image signal, a first multiplier that multiplies the target value by the number of integrations, a second subtractor that calculates an HOB integrated difference value by subtracting the HOB integrated value from an output of the first multiplier, and a second multiplier that calculates the clamp parameter correction coefficient by multiplying the HOB integrated difference value by an adjustment value.

18. The solid-state imaging device according to claim 13, wherein the reference voltage generating unit sets a level of the reference voltage based on the clamp parameter.

19. The solid-state imaging device according to claim 13, wherein the OB clamp circuit calculates the clamp parameter correction coefficient in units of row based on an integrated value of a black level read out from a plurality of OB pixels at a head of each horizontal line before the effective pixel unit.

* * * * *